US005387376A

United States Patent [19]
Gasser

[11] Patent Number: 5,387,376
[45] Date of Patent: Feb. 7, 1995

[54] PROCESS AND APPARATUS FOR MASS TRANSFER BETWEEN LIQUID AND GASEOUS MEDIA

[75] Inventor: Hermann Gasser, Frauenfeld, Switzerland

[73] Assignee: Galipag, Frauenfeld, Switzerland

[21] Appl. No.: 236,167

[22] Filed: May 2, 1994

Related U.S. Application Data

[63] Continuation of Ser. No. 34,655, Mar. 22, 1993, abandoned, which is a continuation of Ser. No. 820,266, Jan. 14, 1992, abandoned.

[30] Foreign Application Priority Data

Jan. 17, 1991 [CH] Switzerland ........................ 00129/91

[51] Int. Cl.[6] .................................................. B01F 3/04

[52] U.S. Cl. ..................................... 261/78.2; 55/241; 55/257.5

[58] Field of Search .................... 261/76, 78.2; 55/241, 55/457.5, 257.6

[56] References Cited

U.S. PATENT DOCUMENTS

| | | | |
|---|---|---|---|
| 2,732,192 | 1/1956 | Johnson et al. | 261/78.2 |
| 3,036,417 | 5/1962 | Mare et al. | 261/78.2 |
| 3,266,224 | 8/1966 | Ferretti | 55/241 |
| 3,302,374 | 2/1967 | Szekely | 261/78.2 |
| 3,467,072 | 9/1969 | Toesca | 261/76 |
| 3,550,356 | 12/1970 | Abboud | 55/241 |
| 3,631,656 | 1/1972 | Hausberg et al. | 55/257.5 |
| 3,722,185 | 3/1973 | Miczek | 55/241 |
| 3,957,465 | 5/1976 | Pircon | 55/257.5 |
| 4,364,750 | 12/1982 | Koncz | 261/116 |
| 4,744,958 | 5/1988 | Pircon | 55/257.5 |

FOREIGN PATENT DOCUMENTS

| | | | |
|---|---|---|---|
| 466194 | 6/1974 | Australia | 55/241 |
| 352902 | 1/1990 | European Pat. Off. | |
| 2057425 | 5/1971 | France | 55/241 |
| 0058964 | 5/1978 | Japan | 261/78.2 |
| 364239 | 1/1932 | United Kingdom | |
| 2096911 | 10/1982 | United Kingdom | 261/78.2 |

*Primary Examiner*—Tim Miles
*Attorney, Agent, or Firm*—Oblon, Spivak, McClelland, Maier & Neustadt

[57] ABSTRACT

A device and process for mass transfer between liquid and gaseous media. Obstacles in the form of orifice plates or discs are installed in a flow channel bearing a gaseous medium, of the device. The obstacles define between them cavities which act as resonance cavities which result in flow forms and pulsations which lead to improved mass transfer with the liquid medium sprayed in through a high-pressure nozzle.

8 Claims, 6 Drawing Sheets

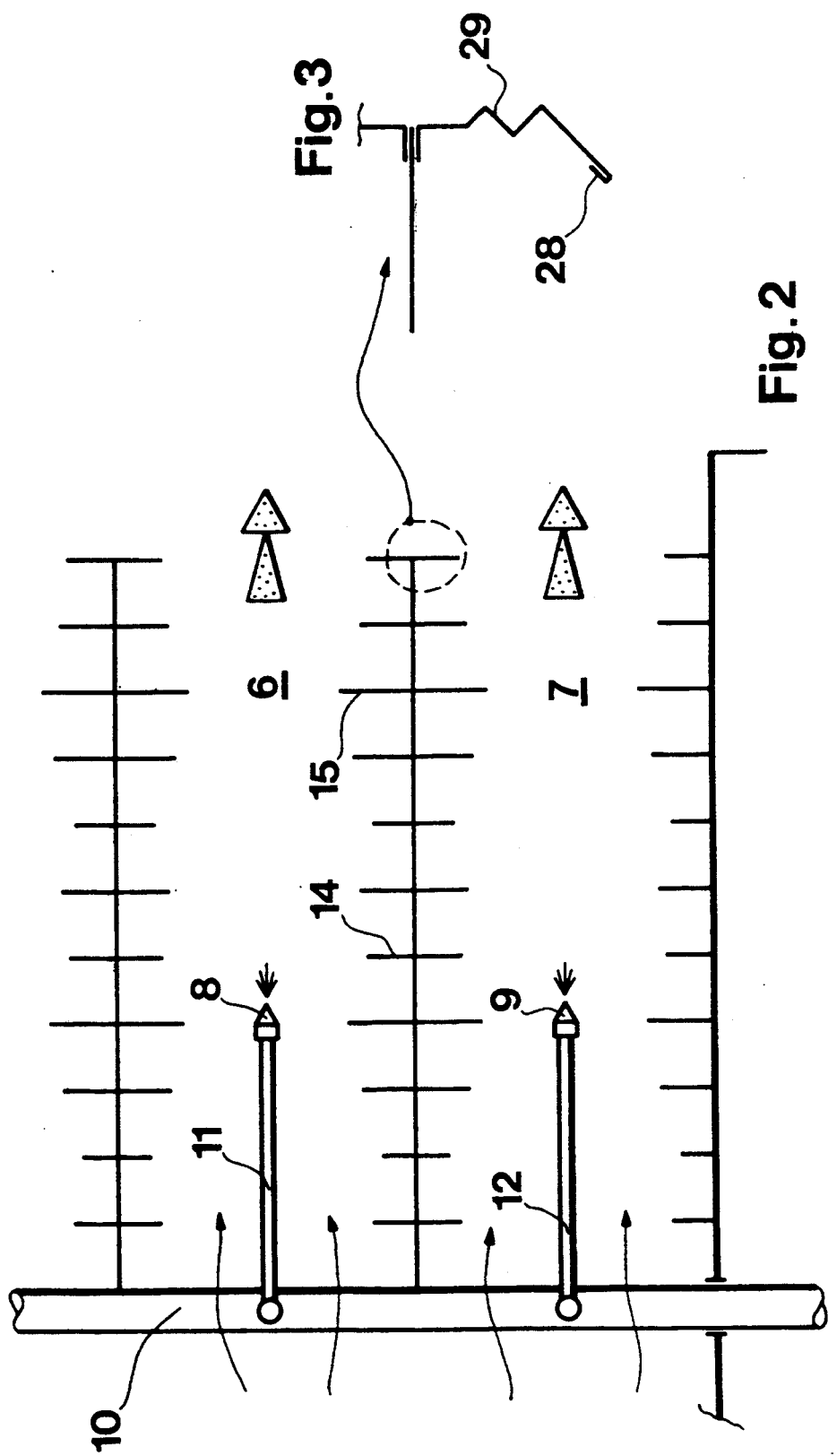

PROCESS AND APPARATUS FOR MASS TRANSFER BETWEEN LIQUID AND GASEOUS MEDIA

This application is a continuation of application Ser. No. 08/034,655, filed on Mar. 22, 1993, now abandoned, which is a continuation of Ser. No. 07/820,266, filed Jan. 14, 1992, also abandoned.

BACKGROUND OF THE INVENTION

1. Field of the Invention

The present invention relates to a process for mass transfer between liquid and gaseous media by spraying the liquid medium into a flow of the gaseous medium generated by forced delivery, and to a device for carrying out the process.

2. Description of the Related Art

For air humidification or flue gas purification, for example, it is known to spray a liquid through spray nozzles into a flow channel of relatively large cross-section, in order to achieve vaporization of the greatest possible proportion of the liquid into the gas stream. At the end of the flow channel, impingement plates are provided for precipitating unvaporized liquid droplets and to return them to a collecting tank.

GB-A 364,239 discloses a gas-washing device which at the same time can be used for humidifying or dehumidifying gases. The device has a spray chamber in which the liquid to be washed is sprayed into a gas flow. Downstream of the spray chamber, a scrubber is provided in which a multiplicity of plates provided with small holes are located. Forcing of the gas through the perforations effects strong turbulence and more complete washing of the gas.

EP-A2 0,352,902 describes a device for mass transfer and heat exchange between a fluid stream and a boundary layer, for example on a membrane. The device has a flow channel for the fluid and a pump for pulsed feeding of the fluid. To obtain improved exchange, obstacles for creating turbulence of the fluid are provided in the flow channel.

SUMMARY OF THE INVENTION

An object of the present invention is to provide for a process of the type described, by means of which more intensive mass transfer is achieved, so that a device for carrying out the process can be constructed in a more compact manner coupled with high throughput and, moreover, a greatly reduced proportion of unvaporized return water results.

By means of the invention, a surprisingly great improvement in mass transfer is achieved, so that a device of relatively small dimensions is sufficient to enrich the gaseous medium up to saturation with liquid medium. Moreover, in spite of the obstacles, the flow resistance in the flow channel is substantially lower than would have to be expected. Presumably, the standing air vortices guiding the axially directed main stream are formed in the spaces between the obstacles, so that the flow resistance is relatively low in spite of the energy expended on generating the vortices. The intensified mass transfer can be explained by the special flow dynamics which are characterized by periodic changes in pressure and alterations in velocity (resonance), as a result of the arrangement of the obstacles and/or the cavities (resonance cavities) formed by them.

Accordingly, the present invention relates to a process for mass transfer between liquid and gaseous media comprising the steps of passing a gaseous medium in a direction of flow through successive constrictions and widenings of a flow path; and spraying a liquid medium by means of at least one high-pressure nozzle into the flow of the gaseous medium, which has already passed through at least one constriction. The successive constrictions and widenings of the flow path causing a change in velocity and pressure of the gaseous medium in contact with the sprayed medium.

The present invention also relates to a device for permitting mass transfer between liquid and gaseous media comprising means for generating a gas stream and creating a gaseous medium; at least one flow channel for guiding the gaseous medium; at least one high pressure nozzle leading into the flow channels; and a plurality of obstacle means provided in at least a part of the flow channel. The plurality of obstacle means being transversely aligned to an axis of the flow channel and being provided at mutual spacings in a direction of flow. The plurality of obstacle means greatly reducing a flow cross-section within narrow local limits and defining between them cavities. An outlet of the at least one high-pressure nozzle means being located in the part of the flow channel in which the plurality of obstacle means are located, and a part of the flow channel provided with the obstacle means starting before the outlet of the high-pressure nozzle with respect to the direction of flow.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 2 shows a longitudinally cut detail of the device according to FIG. 1 in the region of the obstacles;

FIG. 3 shows a detail of an obstacle of the device according to FIGS. 1 and 2;

DESCRIPTION OF THE PREFERRED EMBODIMENTS

Figure 1:
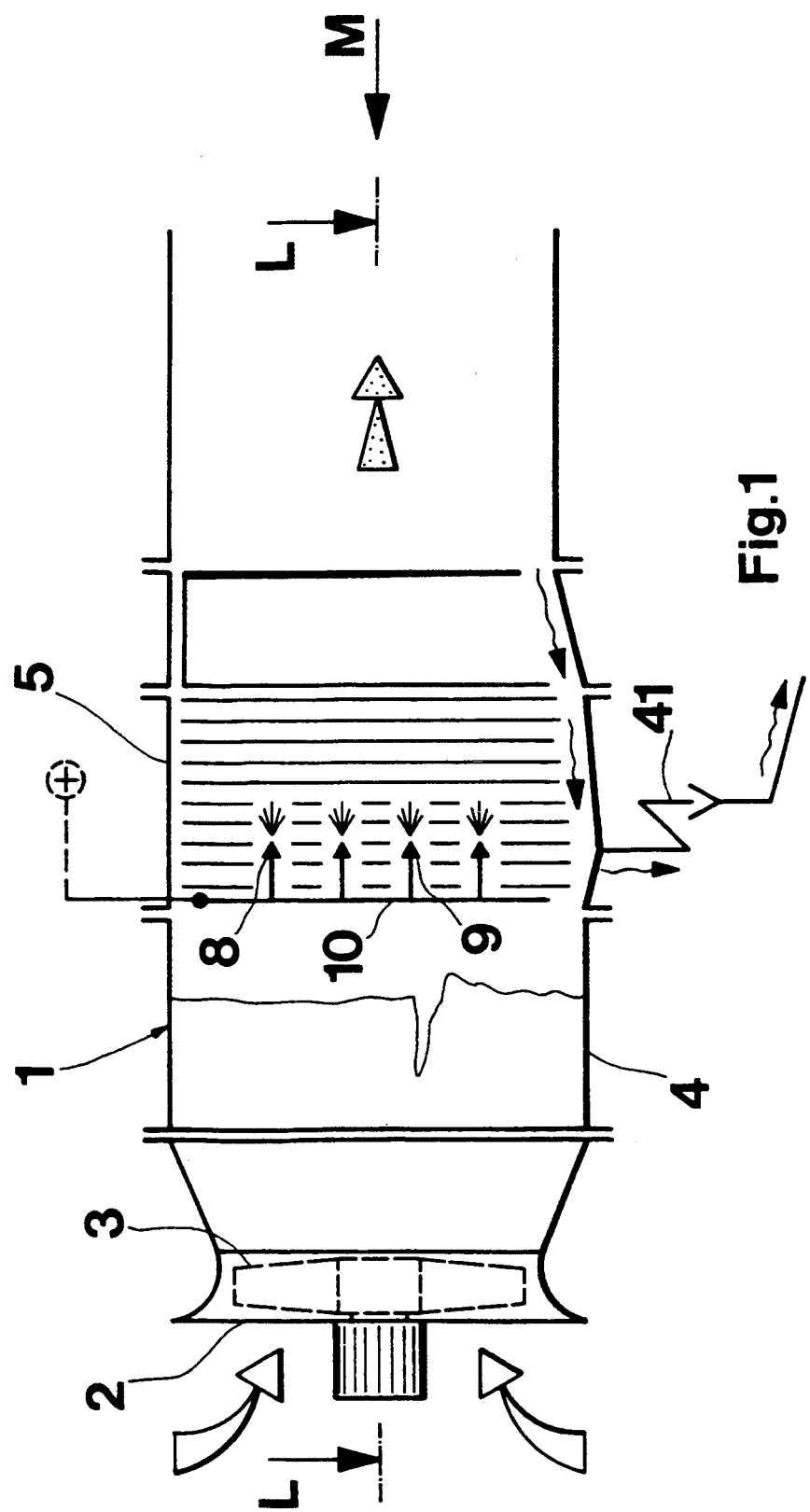
FIG. 1 shows a diagrammatic representation of a device according to the invention in longitudinal section.
Figure 4:
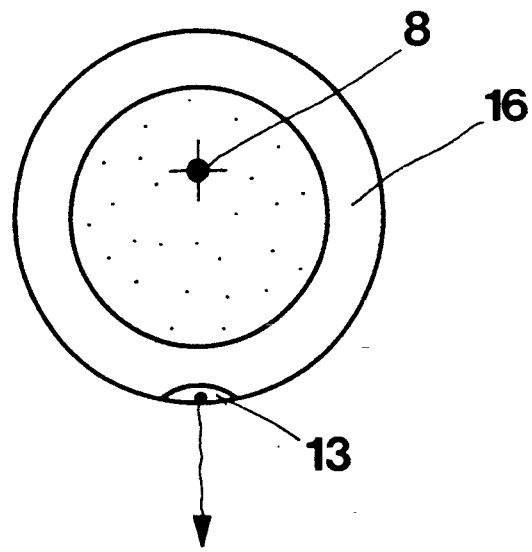
FIG. 4 to FIG. 6 show design examples of the cross-sectional shape of a flow channel of a device according to the invention.
Figure 5:
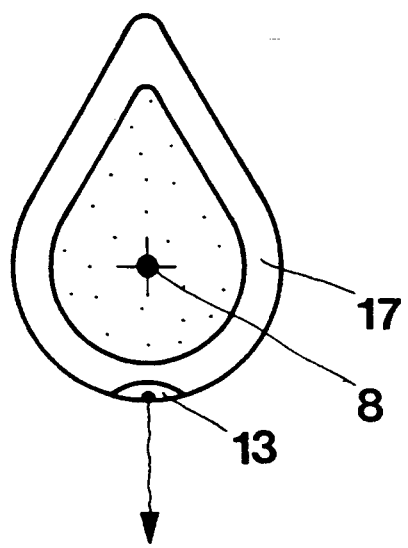
Figure 6:
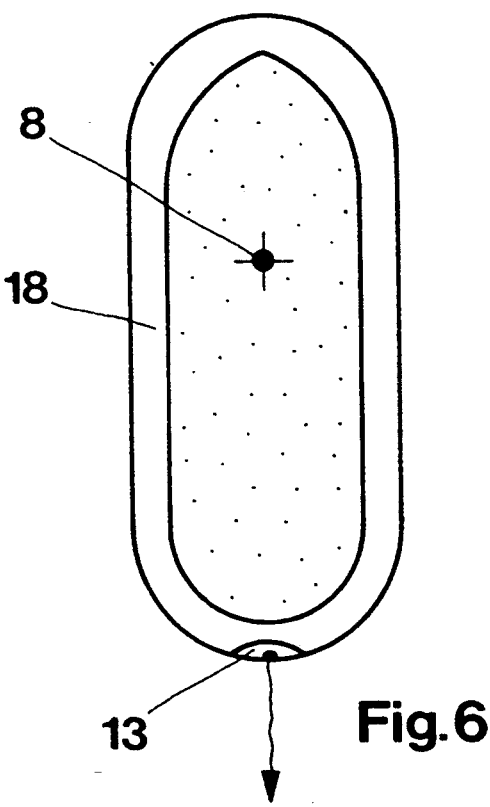
Figure 8:
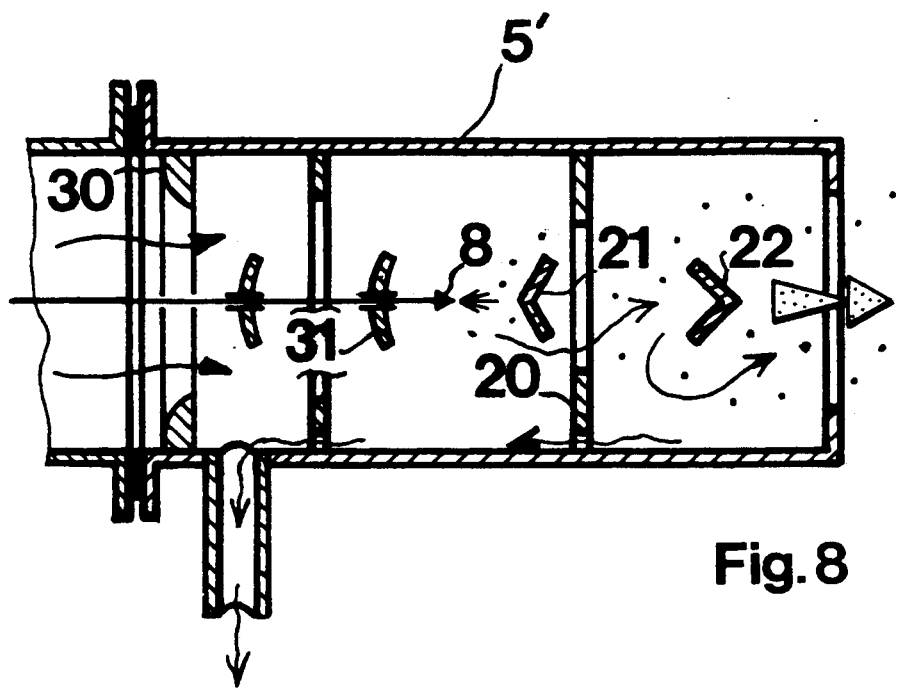
FIG. 8 shows a diagrammatic representation of a flow channel with obstacles having flow through them and around them.
Figure 7:
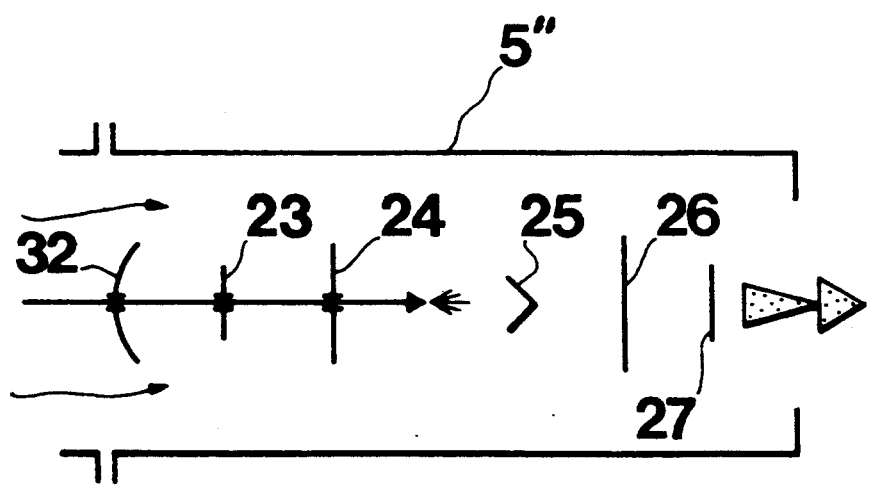
FIG. 7 shows a diagrammatic representation of a flow channel with obstacles having flow around them.
Figure 9:
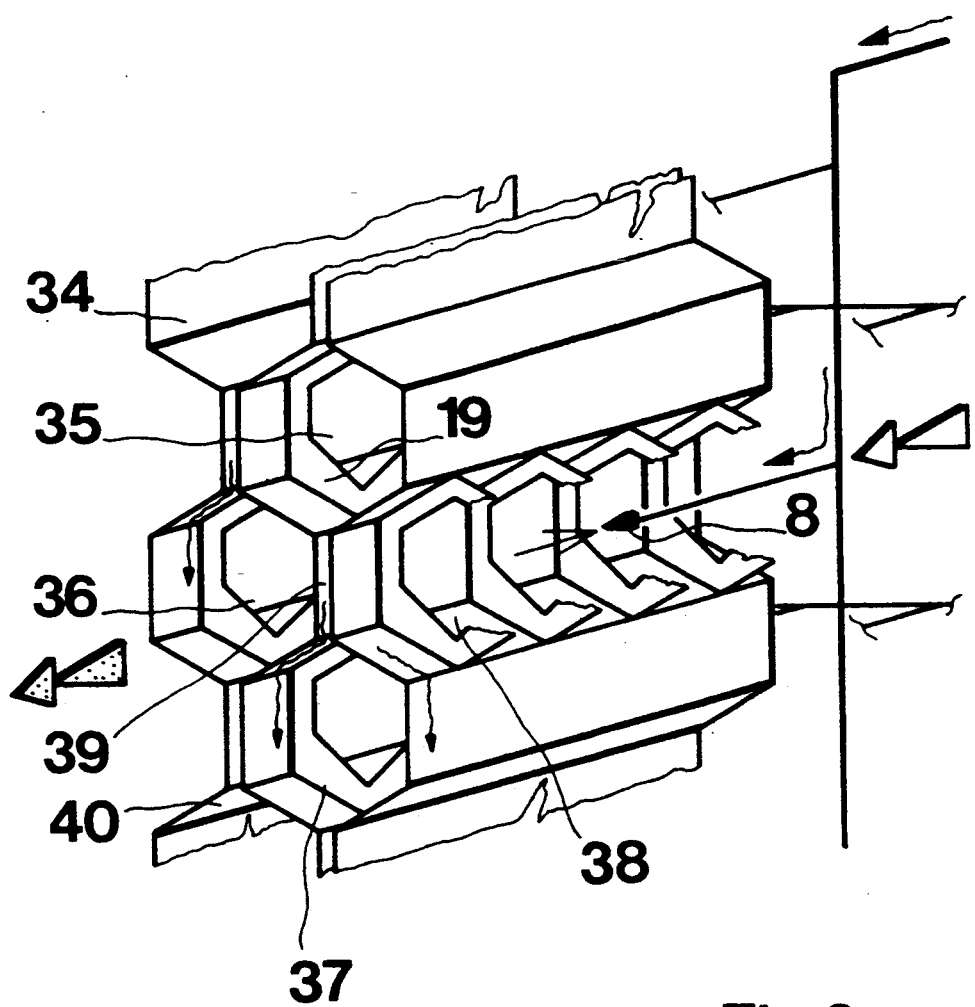
FIG. 9 shows a perspective detail of a honeycomb-type arrangement of mutually parallel flow channel.
Figure 10:
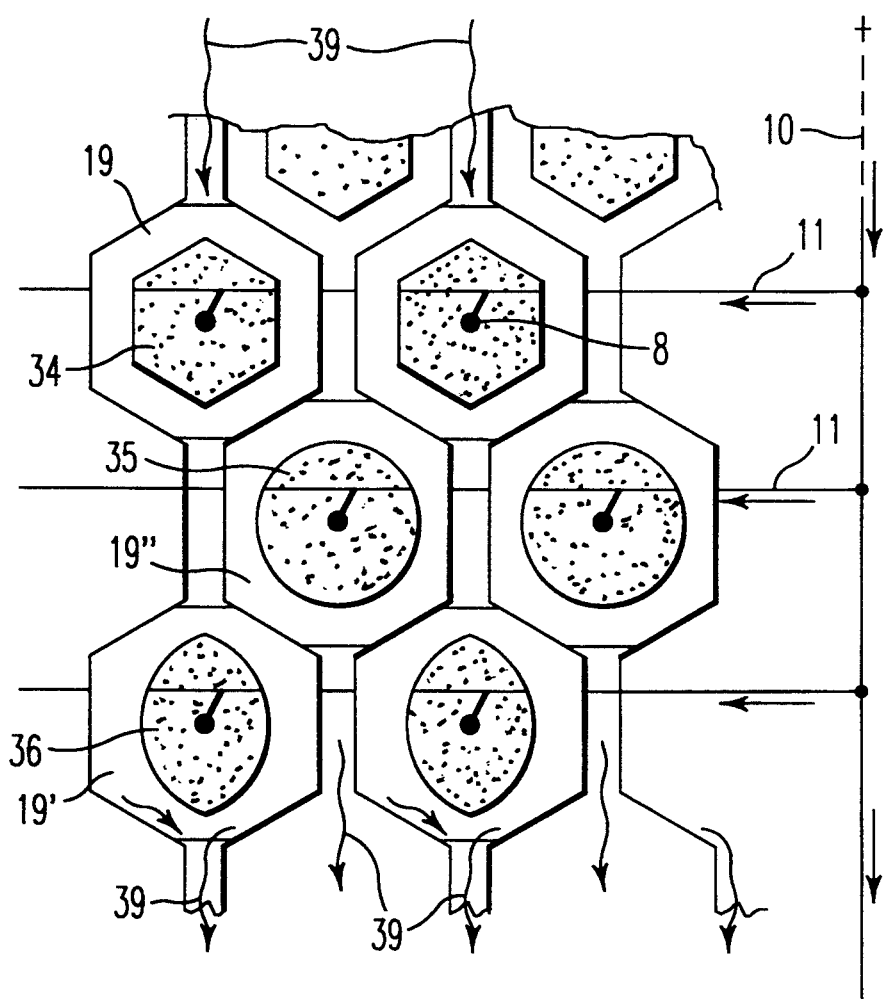
FIG. 10 shows a cross-sectional view of the honeycomb-type arrangement of FIG. 9.

Referring now to the drawings wherein like reference numerals designate identical or corresponding parts throughout the several views, and more particularly to FIG. 1 thereof, an axial fan 3 is located in the flow channel 1 of the device downstream of the inflow opening 2. The fan 3 is adjoined by a guide section 4, so that the gaseous medium passes in uniform flow to the region 5 of the device, where the two media come together. In this region, the device can, corresponding to the illustrative example according to FIGS. 1 and 2 be divided into a plurality of mutually parallel part channels 6, 7 (FIG. 2), in each of which a high-pressure nozzle 8, 9 is located which distributes the liquid medium in very small droplets into the gas stream. The liquid medium is fed via a pipe grid 10 which is arranged in the flow channel 1 and from which one nozzle line 11, 12 in each case leads parallel to the axis of the flow channel 1 centrally into each part channel 6, 7, at the end of which the particular high-pressure nozzle 8, 9 is located. A suitable high-pressure nozzle: JATO molecular atomizer is supplied, for example, by JATO-Düsenbau AG, 6015 Reussbühl/Switzerland. Liquid medium not taken up by the gas stream, such as can occur especially during the starting phase of the device, is taken off from the lowest region of the flow channel via a line 41.

To generate pulsating velocity changes in the gas stream, where the liquid medium is introduced in sprayed form into the flow channel, numerous obstacles 14, 15 are installed in the region 5 or in the part channels 6, 7, which obstacles define between them cavities which act as resonance cavities and cause periodic extensive constrictions of the flow pattern as a result of their arrangement in rows in the direction of flow. The resulting special flow forms effect a substantial improvement in mass transfer, without leading to an unduly great increase in the flow resistance.

The cross-sectional form of the flow channel or of the flow part channels can be designed in different shapes, as illustrated by the examples in FIGS. 4 to 6 and 9. The obstacles 16, 17, 18, 19 here preferably protrude constantly in the peripheral direction of the cross-section into the flow channel, or they are provided with a constant, radially measured width, so that they follow the cross-sectional contour of the flow channel. The cross-sectional forms of FIGS. 5 and 6 effect faster flow in the lower cross-sectional region, so that droplets sinking into this region are more easily carried along again by the gas stream. In addition, this results in improved drainage of liquid wetting the channel wall. However, the obstacles essential to the invention largely ensure that liquid cannot precipitate out of the gas stream on the channel wall. To enable liquid collecting in the lower part of the flow channel to flow off, the latter is arranged with a slight inclination, and the annular obstacles have a small orifice 13 at the bottom.

To contribute to a reduction in the flow resistance, arcuately curved flow vessels 30, 31, 32, which guide the gas stream in the manner of nozzles into the free cross-sectional region of the flow channel, into which the obstacles 20 to 27 do not protrude, are arranged, according to the illustrative examples of FIGS. 7 and 8, at the start of the region 5′, 5″ having the obstacles 20 to 27.

In the examples shown, the obstacles comprise sheet metal parts which are adapted to the cross-sectional shape of the flow channel and are preferably annular or disc-shaped and which, for intensified turbulence in the direction opposite to that of the flow, can be bent off along the edge or bent into a conical shape, as shown by the obstacles 21, 22, 25 (FIGS. 7 and 8). A further variant of the shaping of the flow obstacles with a folded-in edge 28 and corrugations 29 is shown in FIG. 3.

For an adequate effect of the obstacles, they protrude considerably into the flow cross-section of the flow channel, for example by one third of the radius thereof, and their axial mutual spacing is of the order of magnitude of their radial dimension.

FIGS. 9 and 10 show an illustrative example of the device, in which metal sheets bent into corrugations are arranged in parallel at a small mutual spacing, so that they form a plurality of flow channels 34 to 38 with interposed outflow gaps 39 which lead into the flow channel located below. FIG. 10 is a front view of the arrangement of FIG. 9. Reference numeral 39 in FIGS. 9 and 10 illustrate a gap through which the smaller amount of liquid flows off and which precipitates along the channel wall and is collected in the lower part of the channel.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A process for mass transfer between liquid and gaseous media comprising the steps of:

passing a gaseous medium in a direction of flow through successive spaced apart flow restrictions of a flow path; and spraying a liquid medium by means of one high-pressure nozzle in co-current flow into the flow of the gaseous medium only after the gaseous medium has passed through at least one restriction;

wherein two of said successive restrictions of the flow path define a cavity, such that the restrictions and at least one of the cavities cause changes in velocity and pressure of the gaseous medium to obtain said mass transfer while minimizing flow resistance.

2. The process according to claim 1, wherein the liquid medium is sprayed by means of the high-pressure nozzle at a pressure in the range of 5 to 600 bar.

3. A device for permitting mass transfer between liquid and gaseous media comprising:

means for generating a gas stream and creating a gaseous medium;

at least one flow channel for guiding a flow of the gaseous medium;

at least one-high pressure nozzle leading into the flow channel for providing a liquid medium in co-current flow into the flow of the gaseous medium; and a plurality of obstacle means provided in at least a part of the flow channel, said plurality of obstacle means being transversely aligned to an axis of the flow channel and being provided at mutual spacings in a direction of flow, said plurality of obstacle means greatly reducing a flow cross-section within narrow local limits and defining between them cavities, an outlet of said at least one high-pressure nozzle being located in said part of the flow channel in which said plurality of obstacle means are located, and said part of said flow channel provided with said obstacle means starting before the outlet of the high-pressured nozzle with respect to the direction of flow, wherein said at least one high-pressure nozzle introduces said liquid medium into said gaseous medium only after said gaseous medium has passed through at least one of said plurality of obstacle means, and said obstacle means and at least one of said cavities cause changes in velocity and pressure of the gaseous medium to obtain said mass transfer while minimizing flow resistance.

4. The device according to claim 3, wherein the obstacle means are formed by transverse walls of orifice plate type in the flow channel so that there is a flow through them.

5. The device according to claim 3, wherein the obstacle means are located in a central region of the cross-section of the flow channel and are fixed at a mutual spacing and at a distance from the wall of the flow channel, so that there is a flow around them.

6. The device according to claim 3, wherein the obstacle means permit flow both through them and around them and are arranged in the flow channel.

7. The device according to claim 3, wherein the obstacle means comprise flat or slightly curved thin walls aligned perpendicular to the axis of the flow channel.

8. The device according to claim 7, wherein a plurality of flow channels of honey-comb-type overall cross-section are arranged parallel to one another, adjacent flow channels having common walls.

* * * * *